L. STONE.
MEAT TENDERER.

No. 182,243. Patented Sept. 12, 1876.

UNITED STATES PATENT OFFICE.

LEVI STONE, OF MOUNT VERNON, ASSIGNOR OF ONE-HALF HIS RIGHT TO JASPER D. HARRIS, OF DANVILLE, OHIO.

IMPROVEMENT IN MEAT-TENDERERS.

Specification forming part of Letters Patent No. 182,243, dated September 12, 1876; application filed July 7, 1876.

*To all whom it may concern:*

Be it known that I, LEVI STONE, of Mount Vernon, Ohio, have invented certain new and useful Improvements in Meat-Tenderers, of which the following is a full, clear, and exact description, reference being had to the accompanying drawings, making a part of this specification, in which—

Figure 1:
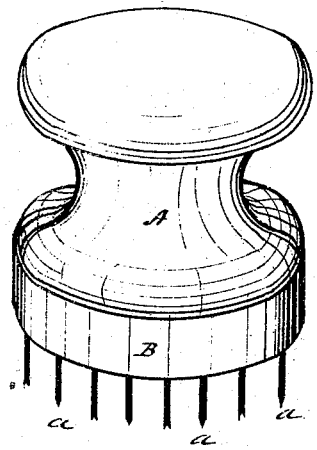
Figure 2:
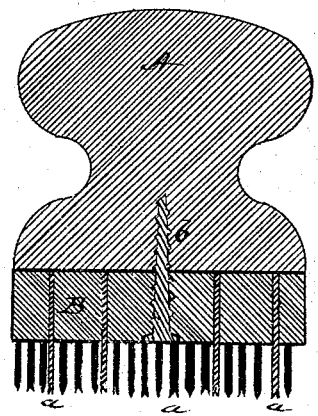

Figure 1 is a perspective view of my invention. Fig. 2 is a vertical section of the same.

My invention relates to a device for tendering meat; and it consists in rows of double-pointed needles, fastened in a head-block, the block being fastened to a handle.

In the said drawings, A represents the handle, and B the head-block, which is secured to the handle by means of the screw *b*. Inserted in this head-block, in rectangular rows, are the double-pointed needles *a a*. By placing the needles in rectangular rows, and having the cutting-edges of one row at right angles to the cutting-edges of the next row, a complete cutting of all the fibers of the meat is insured.

I am aware that a series of knife-blades have been used for this purpose, with all their cutting-edges in a line with each other, which only insures the cutting of the fibers of the meat running at right angles to their edges, leaving the fibers on a line with their edges uncut. By my invention this difficulty is avoided. The needles being round, can be readily withdrawn from the meat without any additional appliances, and without injuring the appearance of the steak.

Having thus described my invention, what I claim as new, and desire to secure by Letters Patent, is—

The block B, provided with the double-pointed needles *a a*, the edges of some being placed at right angles to the edges of others, in combination with the screw *b* and handle A, substantially as and for the purpose set forth.

LEVI STONE.

Witnesses:
CLARENCE SNOOK,
BENJAMIN A. F. GREER.